United States Patent [19]
Hoffman

[11] Patent Number: 5,055,161
[45] Date of Patent: Oct. 8, 1991

[54] MULTIPLE PLY PAPER PRODUCT CONTAINING AN OUTER PLY OF RECLAIMED WHITE OFFICE WASTE

[75] Inventor: Roger P. Hoffman, Green Bay, Wis.

[73] Assignee: Green Bay Packaging Inc., Green Bay, Wis.

[21] Appl. No.: 658,995

[22] Filed: Feb. 21, 1991

[51] Int. Cl.$^5$ .............................................. D21H 11/14
[52] U.S. Cl. .................................. 162/125; 162/128; 162/129; 162/130; 162/147; 162/189
[58] Field of Search ...................... 162/4, 6, 123, 129, 162/130, 147, 183, 125, 189

[56] References Cited

U.S. PATENT DOCUMENTS

| | | | |
|---|---|---|---|
| 4,356,058 | 10/1982 | Fischer et al. | 162/6 |
| 4,381,969 | 5/1983 | DeCeuster et al. | 162/6 |
| 4,711,702 | 12/1987 | Hood | 162/123 |
| 4,820,379 | 4/1989 | Darlington | 162/6 |

FOREIGN PATENT DOCUMENTS

| | | | |
|---|---|---|---|
| 229562 | 7/1987 | European Pat. Off. | 162/127 |
| 2752358 | 3/1979 | Fed. Rep. of Germany | 162/129 |
| 2836805 | 4/1979 | Fed. Rep. of Germany | 162/6 |
| 149878 | 8/1981 | German Democratic Rep. | 162/4 |
| 2026571 | 2/1979 | United Kingdom | 162/147 |

*Primary Examiner*—Peter Chin
*Attorney, Agent, or Firm*—Andrus, Sceales, Starke & Sawall

[57] ABSTRACT

A multi-ply paper product, such as linerboard, composed of a base ply of Kraft pulp and a top ply of reclaimed, white office waste paper which contains fillers, such as clay and calcium carbonate, toners and ink. A dry strength additive, such as cooked starch, is incorporated in the plies and serves to improve the internal strength of the top ply, as well as improving the bond between the plies.

10 Claims, No Drawings

MULTIPLE PLY PAPER PRODUCT CONTAINING AN OUTER PLY OF RECLAIMED WHITE OFFICE WASTE

BACKGROUND OF THE INVENTION

The disposal of old or reclaimed office waste paper is a serious ecological problem. Office waste paper, in general, can include materials such as newsprint, magazine stock, colored ledgers, file stock, xerographic paper, computer printouts, laser printed material, and the like. White office waste, on the other hand, is normally considered to include xerographic paper, laser printed paper, white ledger stock, computer printouts and the like.

The recycling of old or reclaimed white office waste has been limited in the past due to its low strength characteristics. White office waste, due to bleaching, has a lesser strength than virgin unbleached Kraft pulp and if the reclaimed white office waste is repulped, the repulping will further reduce the fiber length and adversely effect the tear strength of the repulped white office waste. Moreover, white office waste contains generally about 8% to 9% of fillers, such as clay or calcium carbonate, as well as quantities of ink and toners. If retained in the pulp, these additives seriously detract from the physical properties of the reclaimed white office waste. On the other hand, removal of the additives is an expensive and time consuming process.

As a further problem, a substantial proportion of white office waste contains calcium carbonate as a filler. Without removal of calcium carbonate, repulped white office waste cannot be used in an acid papermaking process, because the acidic components will react with the calcium carbonate to form calcium sulfate which will deposit in the papermaking machine and adversely effect the papermaking process.

Because of these shortcomings, reclaimed white office waste has been considered unacceptable for use in a paperboard product having high strength requirements, such as linerboard, and reclaimed white office waste has seen only limited use for products such as paper core stock roofing felt, cereal box board, and the like.

SUMMARY OF THE INVENTION

The invention is directed to a multiple ply, high strength paper product, such as linerboard, composed of a base ply of Kraft pulp and a top or outer ply of old or reclaimed white office waste. A dry strength additive, such as cooked or hydrolyzed starch, is incorporated in the plies and acts to increase the internal strength of the white office waste outer ply, as well as improving the bond between the plies.

The base ply is produced from a Kraft pulp stock which can either be virgin Kraft pulp, or may contain up to 100% of recycled or old corrugated containers. One or more Kraft base plies can be included in the linerboard.

The old or reclaimed white office waste contains a substantial proportion of fines or fillers, such as clay, calcium carbonate, ink and toners. Toners are resin used to make electrostatic prints in xerographic and laser printing processes.

To produce the linerboard, a base ply of Kraft pulp stock is hydraulically deposited onto a moving endless porous fabric in the forming section of the papermaking machine, and water is removed from the base ply to provide the base ply with a solids content of about 6% to 8% by weight. A slurry of the reclaimed white office waste pulp stock is then deposited on the base ply and the multiple ply structure is then dewatered from both sides by the use of a top side endless porous fabric. The paper structure is then subsequently carried through the press section of the papermaking machine and then through the dryer section where the remaining moisture in the paper structure is evaporated.

The dry strength agent, such as cooked starch, is introduced either into the Kraft stock or into the reclaimed white office waste pulp stock, or both. The starch acts to increase the internal dry strength of the outer white office waste ply, as well as improving the bond between the plies. As the white office waste pulp contains a substantial portion of fines or fillers, it would not have adequate strength to be used in linerboard without the addition of the dry strength agent.

As a further embodiment of the invention, the reclaimed white office waste pulp stock can be subjected to a high temperature shearing action which serves to abrade the fibers and reduce the particle size of the toners, so that particles of toner are less visible in the finished product. In this regard, the white office waste pulp stock is dewatered to a solids content of about 12% to 30% by weight. This semi-solid cake is then heated to a temperature in the range of about 80° C. to 120° C. and subjected to intense mechanical refining which serves to abrade the individual fibers, thereby increasing the fiber surface area to improve the bonding potential. The interaction further decreases the particle size of the toners to an average size less than about 50 microns, thus making the toner less visible in the final product.

It is also contemplated that in some instances after the high temperature shearing action, the particles of contaminants, such as toner, ink, clay and calcium carbonate, can be substantially removed from the pulp stock by conventional techniques such as froth floatation, washing or the like.

The invention has a substantial impact on the ecology by enabling old or reclaimed white office waste, which would otherwise be disposed of in landfills, to be incorporated in the production of paperboard products, such as linerboard, having high strength requirements. Moreover, it is not necessary to remove the contaminants or fillers from the reclaimed white office waste.

The white office waste top ply provides a brighter, more attractive appearance for the linerboard. For example, the linerboard of the invention has a brightness in the range of 60 to 75 photovolts, as opposed to unbleached Kraft linerboard which has a brightness of only about 6 to 18 photovolts. The improved brightness provides better graphic presentation and high resolution of printing.

While the invention has particular use in producing linerboard it can also be used for other grades of multiple ply paper having high strength requirements.

Other objects and advantages will appear in the course of the following description.

DESCRIPTION OF THE PREFERRED EMBODIMENT

The invention is directed to a multiple ply, high strength, paper product such as linerboard, composed of at least one base ply of Kraft pulp and an outer ply of old or reclaimed white office waste. The linerboard, in general, has a weight basis in the range of 100 to 440 gm/m², and the outer white office waste ply has a dry weight basis of 20 to 150 gm/m².

A dry strength additive, such as cooked cationic starch, is incorporated in at least the outer white office waste ply and acts to increase the internal strength of the outer ply, as well as improving the bond between the plies.

The base ply is composed of Kraft pulp and can be either virgin softwood or hardwood pulp, or mixtures thereof, or alternately may contain up to 100% of recycled old corrugated containers.

The base ply may be produced by a typical Kraft process, in which wood chips are cooked at a temperature of approximately 170° C. with the addition of sodium hydroxide and sodium hydrosulfide (conventional Kraft white liquor) for a period of about 20 to 60 minutes to dissolve the lignin and hemi-cellulose. After cooking, the pulp is washed, which acts to remove up to 98% of the treating chemicals. The pulp is then diluted with water to a solids content of about 4% and treated with sulfuric acid and alum to obtain a pH generally in the range of about 6.0 to 8.0. This pH is higher than that normally used in a typical Kraft linerboard process. Typically linerboard is produced with a pulp having a pH of about 4.0 to 5.0. The use of the higher pH is an important factor in producing the linerboard of the invention, as will be hereinafter described.

White office waste generally includes paper material such as xerographic paper, laser printed paper, white ledgers, computer printouts and the like. In some instances, it is virtually impossible to fully separate other types of waste paper, such as magazine stock or newsprint from the white office waste. Thus the term "white office waste", as used in the description and claims is intended to include white office waste that may contain small amounts of other types of waste paper.

White office waste will normally contain about 8% to 9% by weight of fillers, such as clay or calcium carbonate. In the past, clay was the primary filler, but more recently, an increasing proportion of paper contains calcium carbonate as a filler. In addition, white office waste contains ink used in impact printing and toners which are employed in xerographic or laser printing. Due to the increased use of xerographic and laser printing, the proportion of toners in white office waste will normally be substantially greater than the amount of ink.

The pulping of the white office waste is carried out by mixing the waste with water and chemical dispersants, such as sodium hydroxide. The mixture generally has a solids content in the range of 10% to 20% by weight and is subjected to a shear type of agitation to break the paper down into individual fibers and to liberate any inks and toners, so that the toners have an average particle size of less than about 300 microns. After about 10 to 30 minutes of agitation the mixture is pumped from the agitation vessel and is then subjected to a series of screening steps designed to remove non-fiber contaminants. Non-fiber contaminants can take the form of small objects, such as paper clips or staples, rubber bands, hot melt binders, and the like.

The linerboard is produced from the Kraft and white office waste pulps in the forming section of a conventional papermaking machine. The Kraft pulp at a consistency of about 0.3% to 1.2% solids and at a pH of 6.0 to 8.0 is applied through a headbox to the forming wire in the forming section of the papermaking machine to provide a base ply. Water is removed from the base ply by both gravity and mechanically induced vacuum until the base ply has a solids content in the range of about 6% to 8% by weight. The white office waste pulp stock, having a consistency of about 0.3% to 0.8% solids and also at a pH of about 6.0 to 8.0 is then applied through a second headbox located downstream of the first headbox to the Kraft base ply to provide the composite linerboard structure which is then passed through the press section and the dryer section of the papermaking machine in a conventional manner. In the forming section, water is extracted downwardly from the Kraft base ply and is segregated from water extracted upwardly from the top ply by use of a top side porous fabric. The extracted water from both plies can be recycled and used as dilution water for additional quantities of Kraft pulp stock and white office waste stock, respectively.

As previously noted, a dry strength additive, such as cooked or hydrolyzed starch, is incorporated in the outer ply and preferably in both plies of the linerboard. It is important that the starch be cooked in-situ, meaning it is cooked as it is fed into the pulp stock rather than being precooked. The in-situ cooking can be achieved by a steam injector which heats and hydrolyzes the starch and discharges the hydrolyzed starch into the processing stream. A steam injector such as that supplied by National Starch Company under the designation "Jet Cooker" can be utilized for this purpose.

The starch is preferably an amphoteric, waxy maize type, such as sold under the designation "CATO 225" by National Starch Company. This is a 99% amylopectin starch. The starch is applied at a rate of approximately 16 Kg per tonne of dry pulp.

Hydrolyzed starch is preferably introduced into the old white office waste pulp stock by feeding it into the dilution water and can also be added to the dilution water for the Kraft pulp stock. As previously described the water extracted from the white office waste water ply is maintained separate from the water extracted from the base ply and can be recycled and used as dilution water to form additional quantities of the white office waste pulp stock. By segregating and not combining the extracted water from the two plies, the extracted water from the top ply will not be contaminated with the darker colored extracted water of the base ply.

The starch serves an important function in the invention. As previously related, white office waste, by its very nature, has relatively short fibers and therefore has a relatively low tear strength. Further, the white office waste contains a substantial proportion of contaminants and fillers which detract from its physical properties. These characteristics would normally make white office waste unacceptable for use in a product, such as linerboard, which has high strength requirements. However, the starch provides a substantial increase in the internal strength of the outer ply and also improves the bond between the plies, thus enabling the white office waste to be an acceptable component in the linerboard.

It is also important to maintain the pH of both the Kraft pulp stock and the white office waste pulp stock in the range of 6.0 to 8.0 and preferably in the range of 6.8 to 7.8. This pH is considerably higher than that normally employed in a typical linerboard process. The higher pH is important because the white office waste pulp stock contains a substantial portion of calcium carbonate, and at a lower pH, the calcium carbonate can react with acidic components to form calcium sulfate which can precipitate in the papermaking machine and adversely effect the papermaking operation.

In addition to the starch, a neutral or alkaline internal sizing material, such as an alkyl ketene dimer sold under the name "Hercon UBK II" can be added to the white office waste pulp stock in an amount of about 1 Kg to 10 Kg tonne of dry pulp. The material is effective at the higher pH of the pulp, i.e. 6.0 to 8.0 to make the top ply of the dry linerboard more hydrophobic, so that it will have less tendency to absorb water during service.

An outer size coating can also be applied to the outer surface of the outer ply when the ply is almost dry through a suitable size press. The outer size can be ethylated cornstarch, such as sold by Penford Product Company under the designation "Penford 220". The dry end starch has a viscosity of 1,000 to 1,500 cps at 9% solids and is applied generally at a rate of 1 Kg to 1.25 Kg per tonne of linerboard. The size coating prevents dusting, adds smoothness to the linerboard, and provides an improved printable surface.

Due to the presence of the toners in the white office waste pulp stock, the outer ply of the linerboard will contain minute dark colored or black, isolated specks having particle sizes up to about 300 microns. The outer ply has a brightness in the range of 60 to 75 photovolts and a smoothness of 200 to 350 Sheffield. The bottom surface of the linerboard, which is brown in color has a brightness of 15 to 30 photovolts. In addition, the linerboard has a Mullen burst strength in the range of 2.5 kPa·m$^2$/g to 5.0 kPa·m$^2$/g, a CD STPI of 1.5 to 7.0 kN/m and a weight of 100 to 440 gms/m$^2$. The pH of the linerboard, as determined by TAPPI test procedure T.435om-88, is in the range of 6.0 to 8.0.

As a modified form of the invention, the white office waste pulp stock can be subjected to a high temperature shear operation to reduce the particle size of the toner particles so that the toner particles are less visible in the final product. Following screening, the white office waste pulp stock is dewatered to provide the pulp stock with a consistency of about 12 to 30% by weight. The semi-solid cake is then heated to a temperature in the range of 80° C. to 120° C. and subjected to intense mechanical conditioning in a refiner. The refiner is a conventional type having counter-rotating discs which provides a shear action for the fibers and contaminants. The refining serves to decrease the size of residual contaminants, such as toners, clay and calcium carbonate, to provide an average particle size less than 50 microns. In addition, the high temperature shear also acts to abrade the fibers, increasing the fiber surface area and thus increasing the bonding potential.

By reducing the particle size of the toners, the toner particles will not be visible to the naked eye as black specks in the final product. The reduction in particle size of the toner particles provides only a slight decrease in the brightness of the outer ply of the linerboard. The shear action also reduces the particle size of the clay and calcium carbonate, but this particle size reduction does not have any appreciable effect on the final linerboard product.

The refining of the white office waste pulp stock at a high consistency, i.e. 12% to 30% solids increases the tensile strength of the fibers, but does not adversely effect the tear strength, or the pulp freeness, as occurs in a situation where a low consistency pulp, i.e. 2% to 3% solids, is subjected to a refining operation.

To further enhance the brightness of the outer ply, a substantial proportion of the particles of toner which have been broken down by the high temperature shear action can be removed, if desired, from the white office waste pulp stock by conventional techniques, such as froth floatation or washing.

Through the invention white office waste, which normally could not be employed as a component of a high strength paper product, can be incorporated as a component in linerboard. Thus, the invention has a substantial beneficial impact on the ecology. As the contaminants, such as toner, ink, and fillers, are preferably maintained in the white office waste pulp stock, the problem of disposal of these contaminants is eliminated.

The invention provides an outer ply for the linerboard which has improved brightness, having a brightness in the range of 60 to 75 photo volts, as compared to the brightness of 15 to 30 photo volts for the Kraft base ply. The improved brightness provides better graphics and improved color resolution, and this is of major importance in situations where reading information, such as bar codes, is printed on corrugated containers.

Various modes of carrying out the invention are contemplated as being within the scope of the following claims particularly pointing out and distinctly claiming the subject matter which is regarded as the invention.

We claim:

1. A multiple ply paperboard product, comprising a base ply of cellulosic fibers, an outer ply bonded to the base ply and composed of reclaimed white office waste paper and containing inorganic fillers and toners, and a dry strength additive impregnated in the outer ply, said product having a pH in the range of 6.0 to 8.0, said toners being dispersed as visible dark colored particles in said outer ply and having an average article size less than 300 microns.

2. The product of claim 1, wherein said dry strength additive comprises hydrolyzed corn starch.

3. The product of claim 2, wherein said corn starch is present in an amount of 7.5 to 17.5 Kgs per tonne of said white office waste on a dry weight basis.

4. The product of claim 1, and including an alkaline internal sizing agent incorporated in said outer ply.

5. The product of claim 4, wherein said internal sizing agent comprises an alkyl ketene dimer.

6. A linerboard, comprising a base ply of Kraft pulp, an outer ply bonded to the base ply and composed substantially solely of reclaimed white office waste paper, said white office waste paper containing inorganic fillers and toners, and hydrolyzed starch impregnated in said outer ply, said toners being dispersed as visible dark colored particles in said outer ply and having an average particle size less than 300 microns.

7. The linerboard of claim 6, wherein said inorganic fillers are selected from the group consisting of calcium carbonate and clay.

8. The linerboard of claim 6, wherein said fillers are present in an amount of about 8% to 9% by weight of said waste paper.

9. The linerboard of claim 6, wherein said toners have an average particle size less than 50 microns.

10. The linerboard of claim 6, wherein said outer ply has a brightness in the range of 60 to 75 photo volts and a smoothness in the range of 200 to 350 Sheffield and said linerboard has a Mullen burst strength of 2.5 kPa·m$^2$/g to 5.0 kPa·m$^2$.

* * * * *